United States Patent [19]

Kurtz

[11] Patent Number: 5,549,006
[45] Date of Patent: Aug. 27, 1996

[54] TEMPERATURE COMPENSATED SILICON CARBIDE PRESSURE TRANSDUCER AND METHOD FOR MAKING THE SAME

[75] Inventor: Anthony D. Kurtz, Teaneck, N.J.

[73] Assignee: Kulite Semiconductor Products, Inc., Leonia, N.J.

[21] Appl. No.: 248,428

[22] Filed: May 24, 1994

[51] Int. Cl.⁶ .............................. G01L 19/04; G01B 7/16
[52] U.S. Cl. ............................................. 73/708; 73/777
[58] Field of Search ........................... 73/708, 721, 727, 73/763, 777, 862.474; 338/2, 4, 47; 29/621.1

[56] References Cited

U.S. PATENT DOCUMENTS

| | | |
|---|---|---|
| 3,800,264 | 3/1974 | Kurtz et al. . |
| 3,930,823 | 1/1976 | Kurtz et al. . |
| 4,320,664 | 3/1982 | Rehn et al. ............................ 73/708 |
| 4,994,781 | 2/1991 | Sahagen ............................... 338/47 |
| 5,165,283 | 11/1992 | Kurtz et al. ........................... 73/727 |
| 5,225,126 | 7/1993 | Alles et al. ............................ 73/763 |
| 5,231,301 | 7/1993 | Peterson et al. ....................... 73/727 |
| 5,259,248 | 11/1993 | Ugai et al. ............................. 73/721 |

*Primary Examiner*—Richard Chilcot
*Assistant Examiner*—William L. Oen
*Attorney, Agent, or Firm*—Plevy & Associates

[57] ABSTRACT

A pressure transducer comprising a deflecting member fabricated from a semiconducting material having a first conductivity and a negative temperature coefficient of resistance, and four piezoresistive sensors fabricated from a semiconducting material having a second conductivity opposite to the first conductivity and a positive temperature coefficient of resistance, the sensors being disposed on a first surface of the deflecting member whereby the sensors are to be coupled to form a Wheatstone bridge configuration, and a temperature compensating resistor network fabricated from the semiconducting material of the first conductivity whereby when the resistor network is coupled to the sensors coupled in the Wheatstone bridge configuration, and a voltage placed across the bridge and the temperature compensating resistor network, an output is provided by the bridge which is independent of changes in temperature.

24 Claims, 3 Drawing Sheets

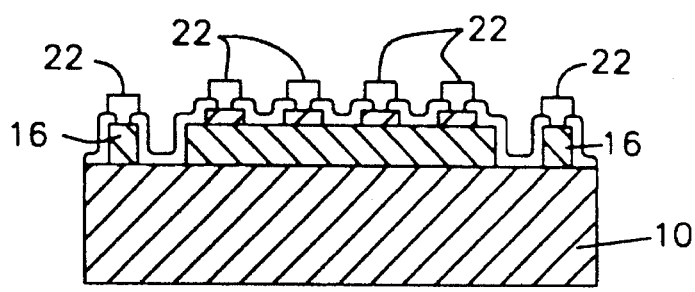
FIG. 4C
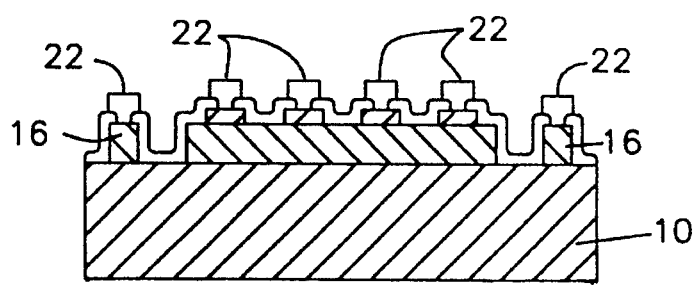
FIG. 5A
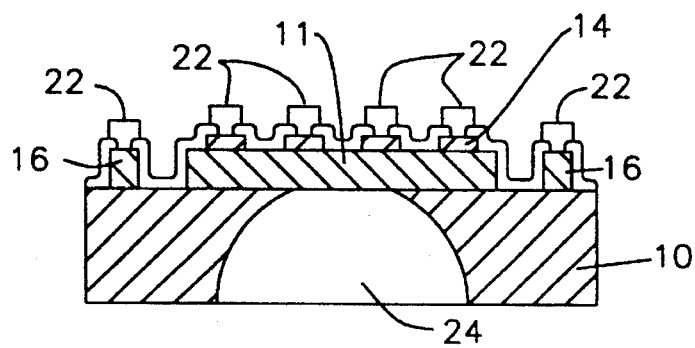
FIG. 5B
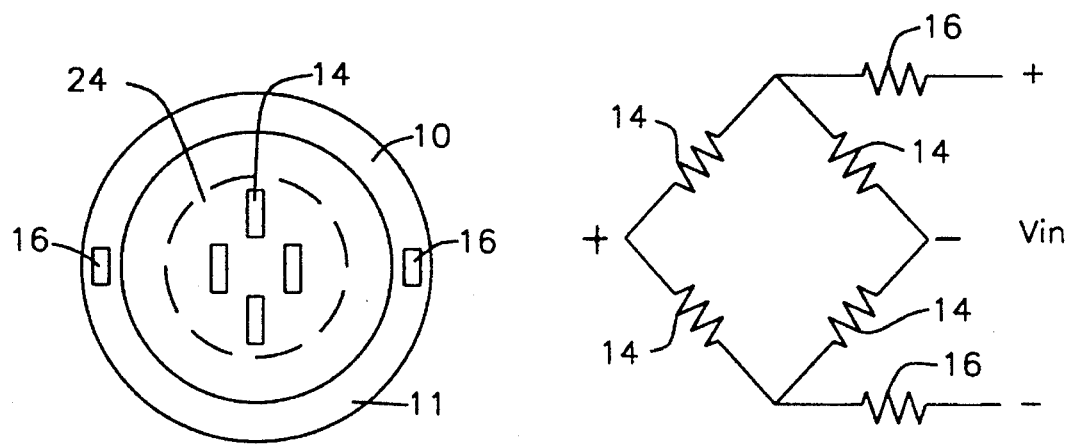
FIG. 5C
FIG. 6

TEMPERATURE COMPENSATED SILICON CARBIDE PRESSURE TRANSDUCER AND METHOD FOR MAKING THE SAME

FIELD OF INVENTION

This invention relates generally to strain gage-type pressure transducers and more particularly, to strain gage-type pressure transducers fabricated from silicon carbide having on-chip temperature compensation.

BACKGROUND OF THE INVENTION

A strain gage type pressure transducer operates to convert a physical displacement into an electrical signal. This type of pressure transducer is well known in the art and generally comprises a deflectable member having one or more piezoresistive elements fabricated thereon. When a force is applied to the deflecting member of this transducer, a voltage is placed across the piezoresistive elements and as the deflecting member bends in response to applied pressure, a resistance change in the piezoresistive elements results in a change in the current flowing through these elements.

In the case of the typical monolithic pressure transducer, the deflecting member comprises a thin silicon diaphragm or cantilever beam into which piezoresistors are diffused or implanted and then connected either internally or externally to form a Wheatstone bridge circuit. Since the piezoresistors are integrally formed on the surface of the deflecting member this configuration acts to effectively amplify the sensitivity of the piezoresistive elements to the force applied to the deflecting member.

Such an integral configuration has the benefit of temperature operation to almost 350° F. Operation at or above this temperature, however, causes the isolation between the sensors and the silicon substrate to deteriorate. The deterioration is caused by thermally generated carriers which serve to short circuit the sensors to the silicon substrate. This problem was essentially solved in the prior art by dielectrically isolating the sensors from the deflecting member. For example, see U.S. Pat. Nos. 3,800,264 and 3,930,823 both of which are entitled HIGH TEMPERATURE TRANSDUCERS AND HOUSING INCLUDING FABRICATION METHODS and both of which are by A. D. Kurtz et al. and assigned to Kulite Semiconductor Products, Inc. the assignee herein.

The devices discussed in the above-named patents, provide dielectric isolation between the sensor network and the deflecting member or force collector. These devices are capable of operating at temperatures in excess of 500° C. Above 600° C., however, the silicon sensing network as well as the silicon deflecting member or force collector, undergo significant plastic deformation rendering the device useless as a pressure transducer. This problem was addressed and solved in the prior art by employing silicon carbide (SiC) both as a sensor and as the force collector. For example, see U.S. Pat. No. 5,165,283 entitled HIGH TEMPERATURE TRANSDUCERS AND METHOD OF FABRICATING THE SAME EMPLOYING SILICON CARBIDE by A. D. Kurtz et al. and assigned to Kulite Semiconductor Products, Inc. the assignee herein. This patent discloses a pressure transducer fabricated from SiC wherein the sensors are dielectrically isolated from the force collector by means of a p-n junction. The pressure transducer described therein is capable of operating at extremely high temperatures in excess of 600° C.

Even though the pressure transducers described in U.S. Pat. No. 5,165,283 are capable of operating at high temperatures, it is difficult to obtain very accurate pressure measurements because of the large variation of sensor output with temperature.

It is well known that most semi-conductor materials exhibit a gage factor which decreases as a function of temperature. The gage factor of a material is the measure of the change of resistance of that material with applied strain. It is desirable for a piezoresistive transducer employing a Wheatstone bridge to have an output which is independent of temperature. This requires a bridge voltage which will increase at a rate that equals the rate at which the gage factor decreases.

If for instance, the TCR (Temperature Coefficient of Resistance) of the Wheatstone bridge is positive and greater than the negative TC of gage factor then, temperature compensation can be obtained by placing a resistor having a zero TCR in series with the Wheatstone bridge and placing a constant voltage across the series combination of the resistor and the bridge.

In silicon carbide, however, not only is the TC of the gage factor negative, but for most resistivities, the TCR is also negative; or has a low positive value.

It is, therefore, an object of the present invention to provide a pressure transducer which employs a plurality of piezoresistive sensors coupled in a Wheatstone bridge configuration and a network of resistors coupled in series with the Wheatstone bridge wherein the resistor has a negative TCR, the value of which is greater than the positive TCR value of the Wheatstone bridge.

SUMMARY OF THE INVENTION

A pressure transducer comprising a deflecting member fabricated from a semiconducting material having a first conductivity type and a negative temperature coefficient of resistance, and four piezoresistive sensors fabricated from a semiconducting material having a second conductivity opposite to the first conductivity and a positive temperature coefficient of resistance, the sensors being disposed on a first surface of the deflecting member whereby the sensors are to be coupled to form a Wheatstone bridge configuration, and temperature compensating means fabricated from the semiconducting material of the first conductivity whereby when the compensating means is coupled to the sensors coupled in the Wheatstone bridge configuration, and a voltage placed across the bridge and the compensating means, an output is provided by the bridge which is independent of changes in temperature.

Also, a method for fabricating a temperature compensated silicon carbide transducer comprising the steps of growing a first layer of semiconducting material having a first conductivity and a negative temperature coefficient of resistance on a first surface of a wafer of semiconducting material having a second conductivity opposite to the first conductivity, growing a second layer of semiconducting material having the second conductivity and a positive temperature coefficient of resistance, selectively etching the second layer to form four piezoresistive sensors therein, selectively etching a first portion of the first layer to form temperature compensating means therein, and selectively etching the wafer to form an aperture having an area underlying the sensors and a second portion of the first layer, the aperture allowing the second portion of the first layer to deflect.

BRIEF DESCRIPTION OF THE DRAWINGS

FIGS. 4A–4C depicts the steps in the method for forming the contacts of the transducer; and FIGS. 5A–5C depicts the steps in the method for forming the diaphragm of the transducer;

FIG. 6 is a schematic diagram depicting the resistor network coupled the Wheatstone bridge formed by the piezoresistors.

DETAILED DESCRIPTION OF THE INVENTION

Before proceeding on with a discussion on how to fabricate a silicon carbide pressure transducer with on chip temperature compensation, reference should be made again to U.S. Pat. No. 5,165,283, the disclosure of which is incorporated herein by reference, wherein the inventors describe a method of fabricating a pressure transducer from SiC. Disclosed therein, is a pressure transducer comprised of an n-type silicon carbide wafer having a p-type SiC epitaxial layer grown on a the surface of the wafer. An n-type SiC epitaxial layer is subsequently grown over the p-type epilayer. The n-type wafer is then shaped by etching to leave the thin p-type epilayer as the deflecting member or force collector. The p-type epilayer operates to isolate the piezoresistors from the n-type wafer.

According to the present invention, by carefully selecting the proper resistivities for the p-type epilayer and the n-type epilayer the TCR of the p-type epilayer can be made significantly larger and more negative than that of the overlying n-type epilayer, which acts as the sensor layer. This configuration allows resistors to be formed from the p-type epilayer whose TCR are much more negative than the TCR of the sensors which form the Wheatstone bridge, that were fabricated from the n-type epilayer.

If the resistors are put in series with the sensors forming the Wheatstone bridge and a voltage is applied thereto, the voltage across the bridge will increase as a function of temperature thus providing temperature compensation for the TCR of the gage factor.

Figure 1:
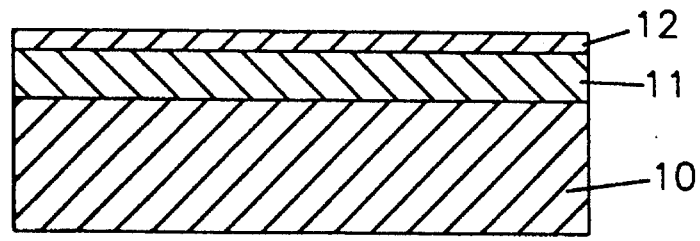
FIG. 1 is a cross-sectional view of a wafer according to a method for forming a transducer according to the present invention.

Referring now to FIG. 1, there is shown a wafer 10 which can be fabricated from n or p-type SiC. In a preferred embodiment of the invention which will now be described, the wafer is fabricated from 6H-SIC n-type material. Typically, the wafer has a doping level $N_d$ of approximately $3 \times 10^{18}$ ohm/cm$^3$ and a thickness of approximately 125 μm. Grown on the top surface of wafer 10 is a layer 11 of p-type SiC. Layer 11 will eventually function as the force collector and is grown to a thickness of approximately 5 μm. Layer 11 has a doping level $N_a$ of approximately $2 \times 10^{19}$ ohm/cm$^3$. The growth of layer 11 is preferably performed by well known chemical vapor deposition (CVD) techniques. On top of layer 11 there is grown a layer 12 of n-type SiC. This layer is also preferably grown by CVD. Layer 12 has a doping level $N_d$ of approximately $3 \times 10^{19}$ ohm/cm$^3$ and is grown to a thickness of approximately 1 μm. Use of the above described doping level for p-type layer with ensure a large negative TCR while the doping level chosen for the n-type layer will ensure a small positive TCR.

Figure 2A:
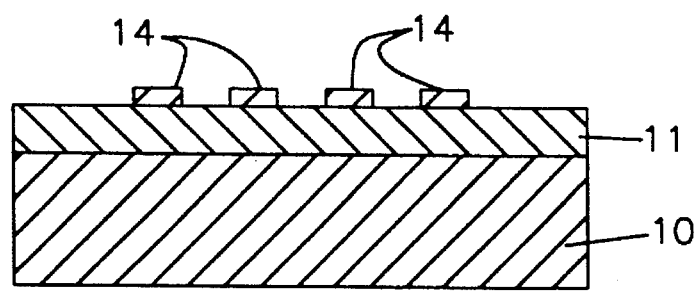
FIG. 2A depicts the step of forming the piezoresistors of the transducer.
Figure 2B:
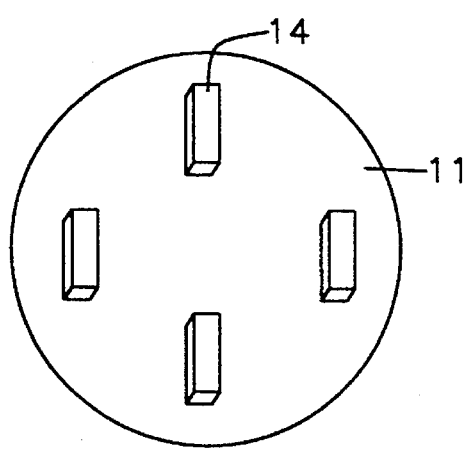
FIG. 2B is a top view of the transducer depicted in FIG. 2A.

Layer 12 is then patterned to form a four-arm piezoresistor network as shown in FIGS. 2A and 2B using standard photolithographically defined mask areas, as well as standard SiC etching methods. Briefly, the piezoresistors 14 are fabricated by growing a layer of SiN or any other suitable masking material over the top of layer 12 by CVD or sputtering. The SiN layer is then patterned to provide the piezoresistor patterns. SiC etching is preferably done using a well known photoelectrochemical etching technique. This technique involves illuminating the n-type SiC layer with an intense light beam, preferably UV, while applying an anodic potential to the n-type layer. Dissolution of the n-type SiC will occur in an HF based electrolyte through the anodic oxidation of the SiC and the removal of this oxide by the HF. Etching will take place in the illuminated areas that are not masked. While this technique is preferred, etching can also be accomplished using dark electrochemical etching, or reactive ion etching both of which are well known in the art.

Figure 3A:
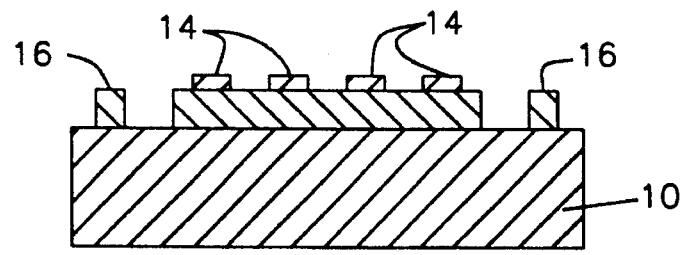
FIG. 3A depicts the step of forming the temperature compensating resistors of the transducer.
Figure 3B:
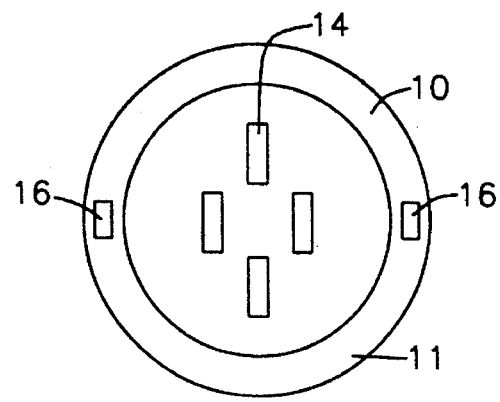
FIG. 3B is a top view of the transducer depicted in FIG. 3A.

The resistors which provide on-chip temperature compensation and the diaphragm are both fabricated next as shown in FIGS. 3A and 3B. This is accomplished by patterning the p-type SiC layer 11 using the photolithographic and SiC etching processes described above. As can be seen, the patterning process leaves an island of p-type SiC with the four-arm n-type SiC piezoresistor network formed on top of it. The island will also form the deflecting member or diaphragm as will be described latter. In addition to the island, two p-type SiC resistors 16 are formed off the island as shown in FIGS. 3A and 3B.

Figure 4A:
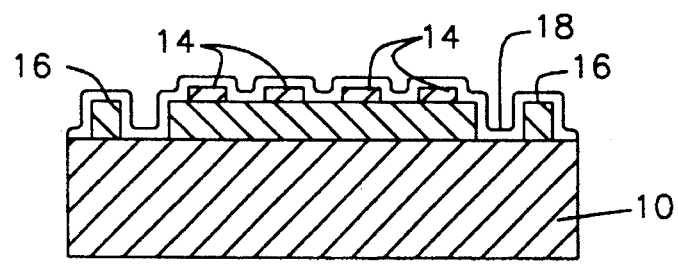
Figure 4B:
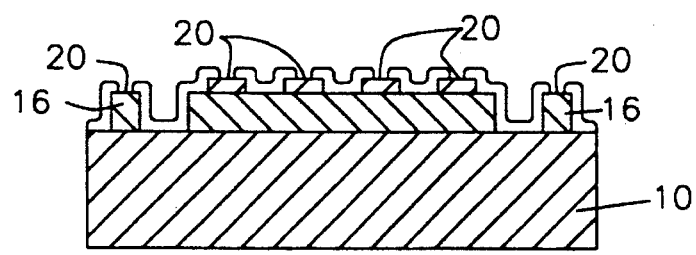

After the etching operations on the p-type epilayer 11 have been completed the ohmic contacts are now fabricated. The techniques for fabricating the ohmic contacts which serve to contact the force sensing resistors will now be described with reference to FIGS. 4A–4C. The exposed surfaces of the p-type and n-type epilayers 11 and 12 are oxidized using either wet or dry oxidation at elevated temperatures as is well known in the art. This process forms a passivating oxide layer 18 of silicon dioxide $SiO_2$ across the aforementioned areas as shown in FIG. 4A. The growth of $SiO_2$ on SiC is well known in the art. The purpose of this layer is to form a mask for fabricating contact windows over the piezoresistors and the compensating resistors. The oxidation process also removes any residue or damage caused by the aforementioned etching process. Once this layer is formed, the contact pattern is etched into the $SiO_2$ layer to provide the aforesaid contact windows 20 using conventional photolithographic techniques and a buffered oxide etch as shown in FIG. 4B. The windows are then filled by depositing a metal layer over the oxide layer 18 using well known sputtering or evaporation techniques. The contacts 22 are finalized by patterning the :metal layer using conventional photolithographic techniques as shown in FIG. 4C. The contact metal which is most desirable for the ohmic contacts to the piezoresistors fabricated from the n-type SiC epilayer is nickel. The contact metal which is most desirable for forming ohmic contacts to the compensating resistors fabricated from the p-type SiC epilayer is Aluminum/Titanium alloy. The contacts are then annealed to ensure that they are ohmic.

The final step in the process is depicted in FIGS. 5A and 5B. This step of the process forms the diaphragm of the device. As shown in FIG. 5A, a mask layer is deposited on the backside of the n-type wafer 10 and patterned photolithographically. The masking material can be platinum which can be deposited by sputtering or SiN which can be deposited by CVD or sputtering.

An aperture 24 is then etched as shown in FIG. 5B. The n-type material is etched, either electrochemically or photoeletro-chemically. The p-type SiC epilayer 11 acts as a etch stop since it is inert to any chemical etch. A diaphragm, as seen in FIGS. 5B and 5C, is fabricated from the p-type SiC island, and thereby completes the compensated transducer chip. The n-type piezoresistor sensor elements 14 are subsequently connected in a Wheatstone bridge pattern with the p-type temperature compensating resistor elements being connected in series with the Wheatstone bridge as depicted in FIG. 6.

It should be understood that the embodiment described herein is merely exemplary and that many alternate embodiments and additional embodiments will become apparent to those skilled in the art. For example, it is clear that the same above-described techniques can be employed to fabricate a cantilever beam or bending beam structure capable of temperature compensation. Beam transducers are well known in the art and consist of a cantilever beam structure which for example, may be supported at both ends wherein the transducers are implanted or otherwise formed therein. Accordingly, such alternative embodiments and additional embodiments are to be construed as being within the spirit of the present invention, even though not explicitly set forth herein, the present invention being limited only by the content and scope of the claims appended hereto.

We claim:

1. In a pressure transducer of the type comprising a deflecting member fabricated from a semiconducting material having a first conductivity and a negative temperature coefficient of resistance, and four piezoresistive sensors fabricated from a semiconducting material having a second conductivity opposite to said first conductivity and a positive temperature coefficient of resistance, said sensors being disposed on a first surface of said deflecting member whereby said sensors are to be coupled to form a Wheatstone bridge configuration, the improvement therewith, comprising:

temperature compensating means fabricated from said semiconducting material of said first conductivity whereby when said compensating means is coupled to said sensors coupled in the Wheatstone bridge configuration, and a voltage placed across said bridge and said compensating means, an output is provided by said bridge which is independent of changes in temperature.

2. The pressure transducer according to claim 1, wherein said temperature compensating means comprises at least one resistor, said resistor being connected in series with said Wheatstone bridge configuration.

3. The pressure transducer according to claim 1, wherein said semiconducting material of said first conductivity is silicon carbide and said semiconducting material of said second conductivity is silicon carbide.

4. The pressure transducer according to claim 1, wherein said semiconducting material of said first conductivity is p-type silicon carbide and said semiconducting material of said second conductivity is n-type silicon carbide.

5. The pressure transducer according to claim 4, wherein said p-type silicon carbide has a doping level ($N_a$) of approximately $2 \times 10^{19}$ ohm/cm$^3$ and said n-type silicon carbide has a doping level ($N_d$) of approximately $3 \times 10^{19}$ ohm/cm$^3$.

6. The pressure transducer according to claim 1, further comprising a wafer of semiconducting material located on a second surface of said deflecting member opposite to said first surface, said wafer having a centrally located aperture which allows said deflecting member to deflect within said aperture when a force is applied thereto.

7. The pressure transducer according to claim 6, wherein said wafer is fabricated from silicon carbide.

8. The pressure transducer according to claim 6, wherein said deflecting member is a diaphragm.

9. The pressure transducer according to claim 6, wherein said deflecting member is cantilever beam.

10. The pressure transducer according to claim 1, further comprising metal contacts fabricated over said sensors and said temperature compensating means.

11. A method for fabricating a temperature compensated silicon transducer comprising the steps of:

growing a first layer of semiconducting material having a first conductivity and a negative temperature coefficient of resistance on a first surface of a wafer of semiconducting material having a second conductivity opposite to said first conductivity;

growing a second layer of semiconducting material having said second conductivity and a positive temperature coefficient of resistance;

selectively etching said second layer to form four piezoresistive sensors therein;

selectively etching a first portion of said first layer to form temperature compensating means therein; and selectively etching said wafer to form an aperture having an area underlying said sensors and a second portion of said first layer, said aperture allowing said second portion of said first layer to deflect.

12. The method according to claim 11, further comprising the step of fabricating contacts for said sensors and said temperature compensating means.

13. The method according to claim 12, wherein said step of fabricating contacts comprises the steps of:

forming a passivating layer over said sensors and said temperature compensating means;

patterning said passivating layer to form contact windows over said sensors and said temperature compensating means; and depositing metal contacts into said windows.

14. The method according to claim 13, wherein said step of depositing metal contacts includes evaporation of a metal contact pattern into said windows.

15. The method according to claim 13, wherein said step of depositing metal contacts includes sputtering of a metal contact pattern into said windows.

16. The method according to claim 11, wherein said first layer of semiconducting material is p-type silicon carbide and said second layer of semiconducting material is n-type silicon carbide.

17. The method according to claim 11, wherein said steps of growing includes chemical vapor deposition.

18. The method according to claim 11, wherein said steps of selectively etching includes reactive ion etching.

19. The method according to claim 11, wherein said steps of selectively etching includes photochemical etching.

20. The method according to claim 11, wherein said steps of selectively etching includes dark electrochemical etching.

21. The method according to claim 11, wherein said second portion of said first layer is a diaphragm.

22. The method according to claim 11, wherein said second portion of said first layer is a cantilever beam.

23. The method according to claim 11, wherein said first layer of semiconducting material is p-type silicon carbide and said second layer of semiconducting material is n-type silicon carbide.

24. The method according to claim 23, wherein said p-type silicon carbide has a doping level ($N_a$) of approximately $2 \times 10^{19}$ ohm/cm$^3$ and said n-type silicon carbide has a doping level ($N_d$) of approximately $3 \times 10^{19}$ ohm/cm$^3$.

* * * * *